D. G. LITTLEFIELD.
Magazine Stove.
No. { 132, 1,236. }
Reissued Nov 19, 1861.
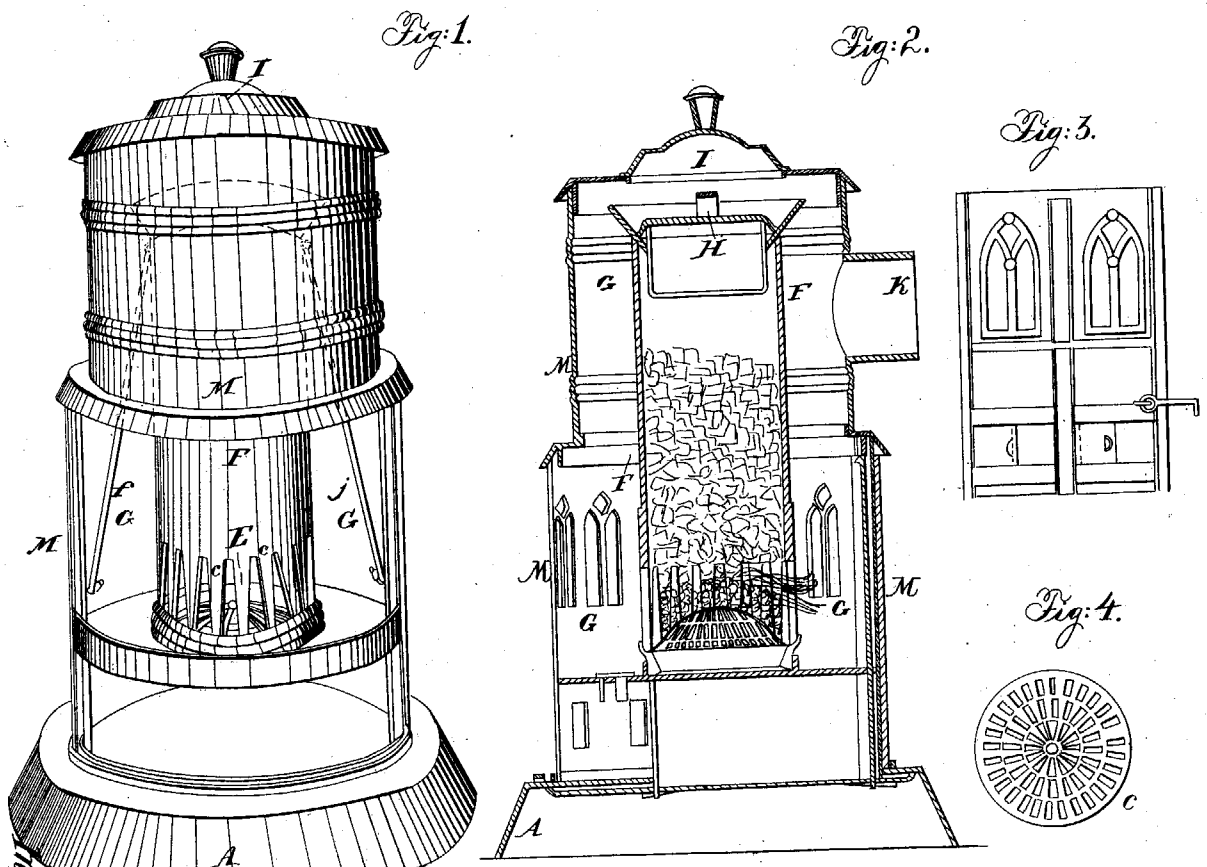
Witnesses.
Gustavus Dietsch
R. L. Cobb
Inventor
D. G. Littlefield
by
Dewitt C. & Lawrence
Robt. M. Pennuck
his Attys.
N. PETERS, PHOTO-LITHOGRAPHER, WASHINGTON, D. C.

UNITED STATES PATENT OFFICE.

DENNIS G. LITTLEFIELD, OF ALBANY, NEW YORK.

IMPROVEMENT IN STOVES.

Specification forming part of Letters Patent No. 10,448, dated January 24, 1854; Reissue No. 1,236, dated November 19, 1861.

DIVISION NO. 1.

*To all whom it may concern:*

Be it known that I, DENNIS G. LITTLEFIELD, of Albany, in the county of Albany and State of New York, have invented a new and useful Improvement in Base-Burning Stoves; and I do hereby declare that the following is a full and exact description thereof, reference being had to the accompanying drawings, and to the letters of reference marked thereon.

Stoves for burning "anthracite," "mineral," or "fossil" coals have been contrived in which a reservoir for the coals has been applied immediately over a fire pot in such a position that as the coal is consumed in the fire-pot the coal in the reservoir descends and supplies the place of that consumed. In such cases the ignition has taken place entirely within the fire-pot, no portion of the flame passing through into a contiguous or adjoining space or chamber, and under such conditions that the gases might be ignited in contact with the partially-burned coal, and the consequence has been that a large portion of the gases produced from such coal has passed off unconsumed, causing a great waste of fuel, while the partially-consumed coals from which the more volatile and inflammable portions have been expelled are soon cooled and extinguished, the current of air which makes its way up through the fire being insufficient to keep the combustion to a point that would consume all the cinders and more refractory portions of the coal, unless the fire were rushed, when other inconveniences result, such as the formation of "clinkers" and the destruction of the fire-pot, the stove in such case requiring frequently to be cleaned out to rid it of these clinkers and unconsumed coals. On this account it has been impracticable in any stove heretofore constructed, whether with or without a coal-supply reservoir for this class of fuel, or whether used with a fire-pot or a grate, to maintain the fire for a considerable length of time without the necessity of cleaning it out, as before mentioned.

It is furthermore well known that the perfect and entire combustion of what is commonly called "anthracite," "mineral," or "fossil" coal can only be effected by causing the hydrogen of the coal as well as the various products of imperfect combustion—such as carbureted hydrogen and carbonic oxide—to ignite in immediate contact with the solid portions or partially-consumed coals from which the gases have been expelled, the two, as it were, helping to consume each other. To effect this combustion of the waste gases with the carbon of the coals, as well as the complete consumption of the refractory portions of the coal, at the base of a stove instead of at the top, in a stove which is supplied upwardly from below the entire mass of coal by means of a flue leading outside of the room, as distinguished from a draft which is supplied from above and downward through the mass of the coal, either by accident or design, is the object of my invention; and I wish it to be distinctly understood that my invention is especially novel in this respect, to wit: that the highly-heated gases which are thrown off from the incandescent coal on the fire-grate at the base of the stove, as well as from the heated coal in the coal-supply chamber, are caused to be burned laterally below, and also outside, the coal-supply chamber, and entirely down to the said grate, and, after having spent themselves, circulate over, or a portion of them circulate over, the top of the coal-supply chamber, and are finally discharged through a flue leading outside the room in which the stove is situated. For this purpose I employ a grate at or near the base of the stove, which is overhung by a reservoir for the reception of the gases which arise from the burning and heating of the coal. As this reservoir, which serves also to contain a supply of fuel, is closed at the top, and the only escape for the gases which it collects is at its bottom, at a point where the solid, unconsumed coal is in a state of ignition, these gases are there inflamed, and, by the heat thus produced, aid in the combustion of the partially-consumed coals, which always and under the most favorable circumstances burn much more reluctantly than the fresh coal, as their most inflammable elements have already been dissipated. By collecting these gases in the manner above described, and igniting them in immediate contact with the unconsumed portion of the coals, I am enabled to consume the latter at the same time that the otherwise waste gases are economized, and the fuel is consequently entirely utilized, the ashes falling from the grate at the bottom, free from clinkers and cinders.

To enable others skilled in the arts to make and use my invention, I will now proceed to describe one mode of the construction of a stove by means of which my said invention may be carried into practice, reference being had to the accompanying drawings, forming a part of my specification, in which—

Figure 1 is a vew of a cylindrical stove, a part of the outer cylinder and doors being removed; Fig. 2, a central vertical section of the same; Fig. 3, a front view of one of the doors, and Fig. 4 a plan view of a grate.

The base A and outer cylinder, M, may be of any convenient form. This cylinder M is provided with a close-fitting cover, I. It is also provided with a draft-flue, K, for the passage of the smoke and spent gases out of the stove into a flue leading outside the room in which the stove is situated.

G is a smoke and spent-gas passage or chamber connecting with the exit-pipe K, surrounding the top and sides of a coal-supply chamber, F, and prevents the entrance of any cold air into the chamber F from the outside of the stove through the openings in the top of the outer wall, M, and the top of the coal-supply chamber F beneath the covers I and H. Within the outer wall, M, is a coal-supply chamber, F, also having a close-fitting cover, H. This coal-supply chamber is suspended over a fire-pot, E, into which it fits, by means of rods *j*, as shown in the drawings, said fire-pot E being open at its bottom and open at its sides, the openings at its sides commencing at its lower end and extending upward toward the supply-chamber F such suitable distance as it is desirable to have the coal ignite above the grate C at its bottom portion, the grate C being in this instance of a convex form.

The vertical openings in the sides of the fire-pot E are in part intended to facilitate the draft of air through the burning mass of coal on top of the grate C, and the air entering below the grate C passes upward through the grate and out at said openings on all sides of said fire-pot and below said coal-supply chamber.

A portion of the gases generated by the incandescent coal on the grate C, as well as the gases expelled from the heated superincumbent coal in said coal-supply chamber, are temporarily confined in said coal-supply chamber until, becoming sufficiently heated and expanded, they are forced down said supply-chamber and find egress through the said vertical openings, previous to which they are met by the current or draft of air aforesaid. The said gases and current of air thus meeting and commingling ignite among the outer mass of incandescent coal on the fire-grate C, and pass together in the form of flame beneath the coal-supply chamber and into the chamber G, thus causing a bright light and intense heat within said chamber G, and at the lowest available point—to wit, the base of the stove. The descent of the gases from the coal-supply chamber and the ascent of the draft of air up through the grate C, being each drawn away laterally on all sides from a common center—to wit, the vertical axis of the stove—by reason of the draft through the exit-pipe K and surrounding chamber G, causes the gas and air currents to spread from the center of the mass of incandescent coal on and over the grate C, and thus in an ignited condition infuse themselves thoroughly in contact with all parts of the mass of coal surrounding such center. By these means the whole mass of incandescent coal becomes thoroughly consumed upon the grate C, and the gases are utilized to form a bright and cheerful flame as well as intense heat within the chamber G at or near the base of the stove and in close proximity to the outer wall, M. The gases thus utilized and spent then pass up the chamber G and out at the exit-pipe K into a flue or passage leading outside the room, in which the stove is situated, a portion of such gases in their passage and exit going over the top of the coal-supply chamber in a space situated between the top of the said supply-chamber and the outer wall of the stove.

It is hardly necessary to add that as the coal upon the grate C is consumed and passes off in ashes the coal from the supply-chamber F descends to take the place of that consumed.

Having thus described one mode of carrying out my said invention, what I claim as new, and desire to secure by Letters Patent of the United States, is—

An organization which temporarily confines the gases of the supply-coal in a coal-supply chamber, then burns the gases of the supply-coal and the gases of the incandescent coal laterally below and outside of the coal-supply chamber and entirely down to the grate, and thereafter circulates the spent gases, or a portion of them, over the top of the coal-supply chamber and between it and the outer wall of the stove, and finally discharges them through a flue leading outside the room in which the stove is situated.

DENNIS G. LITTLEFIELD.

Witnesses:
THOMAS HASTINGS,
ROBERT G. HENDRIE.